US012677022B2

(12) United States Patent
Puramana et al.

(10) Patent No.: US 12,677,022 B2
(45) Date of Patent: Jul. 7, 2026

(54) DYNAMIC GENERATION OF DELAY FACTOR FOR CONTENT RECEIVER

(71) Applicant: DISH Network Technologies India Private Limited, Bangalore (IN)

(72) Inventors: Dileep Puramana, Bangalore (IN); Vikram Balaraja Shetty, Bangalore (IN); Visali Manoharan, Chennai (IN); Manasa Jami, Visakhapatnam (IN)

(73) Assignee: DISH NETWORK TECHNOLOGIES INDIA PRIVATE LIMITED, Bengaluru (IN)

( * ) Notice: Subject to any disclaimer, the term of this patent is extended or adjusted under 35 U.S.C. 154(b) by 0 days.

(21) Appl. No.: 18/946,590

(22) Filed: Nov. 13, 2024

(65) Prior Publication Data

US 2026/0136059 A1 May 14, 2026

(51) Int. Cl.
*H04N 21/422* (2011.01)
(52) U.S. Cl.
CPC .............................. *H04N 21/42215* (2013.01)

(58) Field of Classification Search
CPC ................................................ H04N 21/42215
See application file for complete search history.

(56) References Cited

U.S. PATENT DOCUMENTS

| | | | |
|---|---|---|---|
| 2007/0162778 A1* | 7/2007 | Dutton .................. | G06F 1/3215 |
| | | | 713/323 |
| 2012/0235912 A1* | 9/2012 | Laubach .............. | G06F 3/0485 |
| | | | 345/163 |
| 2016/0165172 A1* | 6/2016 | Hu .................... | H04N 21/42215 |
| | | | 348/731 |
| 2022/0043520 A1* | 2/2022 | Wang .................... | G06F 3/0238 |
| 2023/0029152 A1* | 1/2023 | Zaloum ................. | G06F 21/316 |

* cited by examiner

*Primary Examiner* — Priyank J Shah
(74) *Attorney, Agent, or Firm* — Seed Intellectual Property Law Group LLP

(57) ABSTRACT

Systems and methods for providing a dynamic delay factor for using a remote control. A plurality of remote-control button presses are received by from a user. At least one button press time associated with the plurality of remote-control button presses is determined. A delay factor is generated for the user based on the at least one button press time. And at least one content receiver event, such as a wait time for a next button press or a length of time to display a menu, is employed based on the generated delay factor.

18 Claims, 5 Drawing Sheets

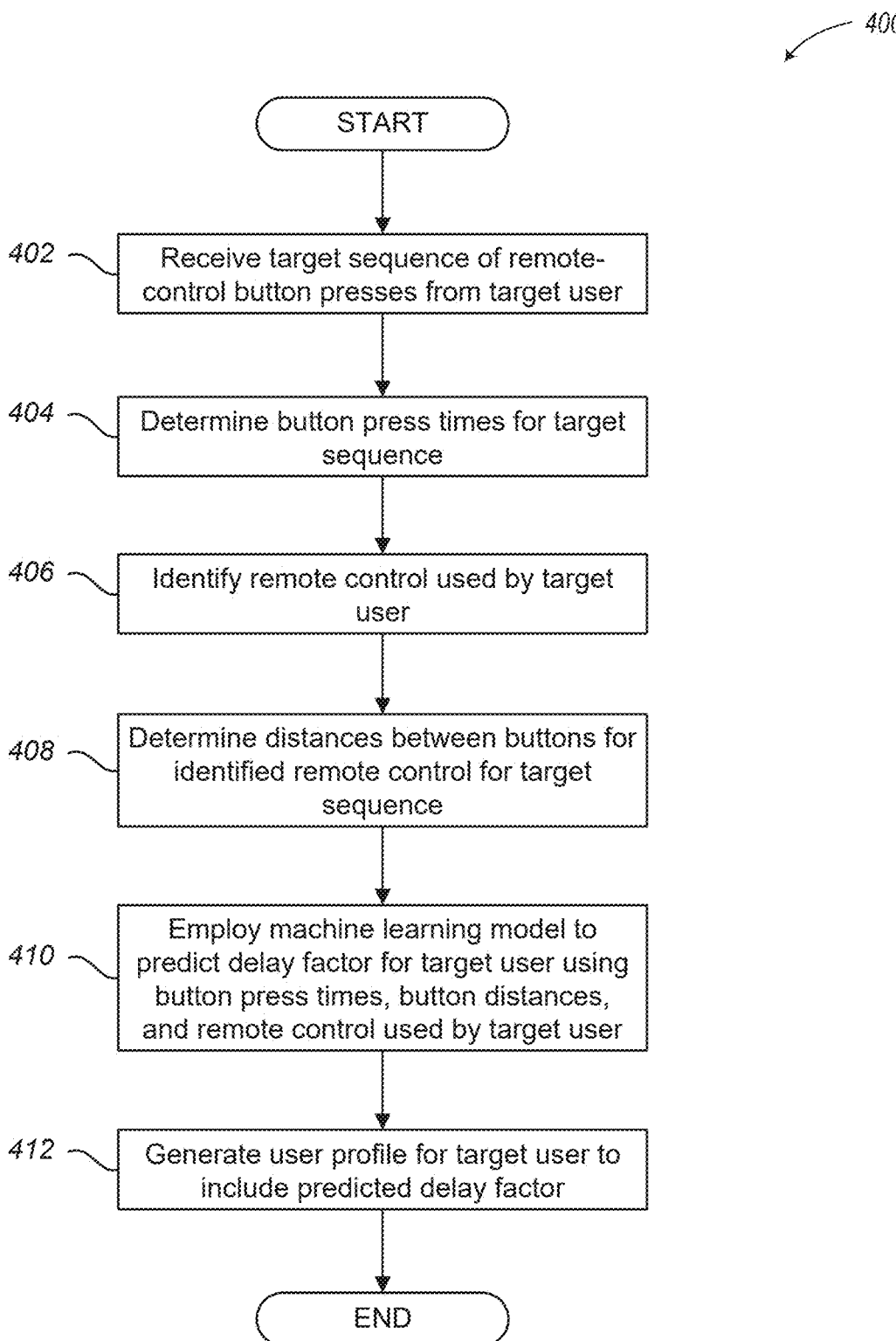

*400*

START

402 — Receive target sequence of remote-control button presses from target user

404 — Determine button press times for target sequence

406 — Identify remote control used by target user

408 — Determine distances between buttons for identified remote control for target sequence 410 — Employ machine learning model to predict delay factor for target user using button press times, button distances, and remote control used by target user 412 — Generate user profile for target user to include predicted delay factor

END

*FIG. 4*

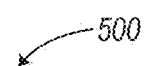
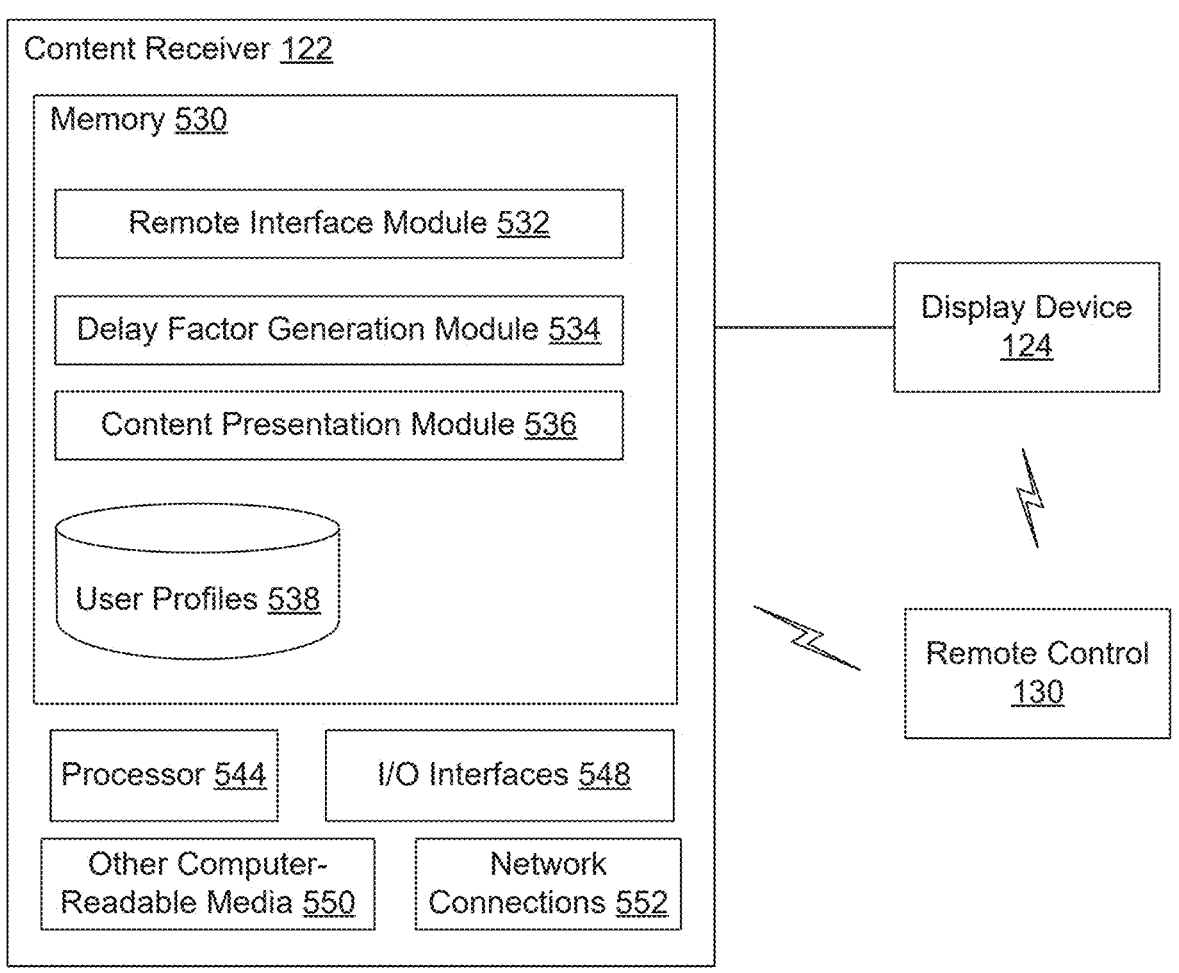
*FIG. 5*

DYNAMIC GENERATION OF DELAY FACTOR FOR CONTENT RECEIVER

BACKGROUND

As people get older, they generally slow down and begin to spend more time indoors. As a result, many elderly people turn to watching television as a way to stay busy and observe the world. But many elderly people also have various mobility restrictions, such as weaker hands and fingers, slowed movements, and longer mental processing times. These restrictions impact each person differently. So, watching television and changing channels can be easy for one person, but difficult for another. It is with respect to these and other considerations that the embodiments described herein have been made.

BRIEF SUMMARY

Embodiments are directed to the dynamic generation of a delay factor for a content receiver to perform an event or action. In various embodiments, a user of the content receiver is identified, for which a delay factor is specifically selected for that user. In some embodiments, the delay factor is selected based on button press times between the user pressing buttons on a remote control for the content receiver. In other embodiments, the delay factor is selected based on times for how long buttons are pressed on a remote control for the content receiver. The user experience for that particular user then then customized when the user is using the content receiver based on the selected delay factor for the user.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings:

FIG. 4 illustrates a logical flow diagram showing one embodiment of a process for employing a trained a machine learning model to predict a delay factor for a target user in accordance with embodiments described herein.

FIG. 5 shows a system diagram that describe various implementations of computing systems for implementing embodiments described herein.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
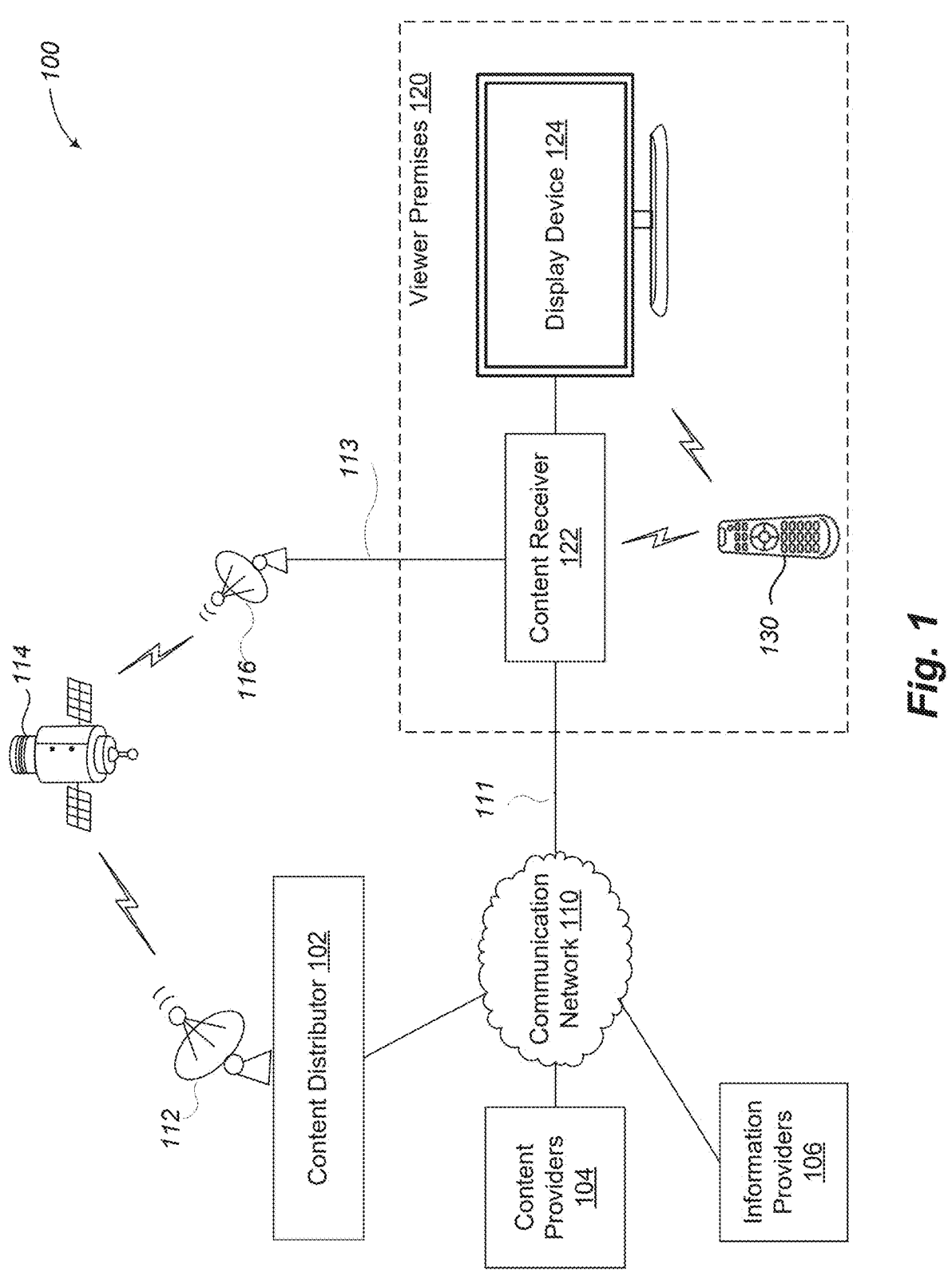
FIG. 1 illustrates a context diagram of an environment for dynamically generating a delay factor for a user of a content receiver in accordance with embodiments described herein.

FIG. 1 illustrates a context diagram of an environment 100 for dynamically generating a delay factor for a user of a content receiver in accordance with embodiments described herein. Environment 100 includes content providers 104, information providers 106, content distributor 102, communication network 110, and viewer premises 120.

Viewer premises 120 includes a content receiver 122, a display device 124, and a remote control 130. The content receiver 122 is a computing device that receives content for presentation on the display device 124 to a viewer on the viewer premises 120. In some embodiments, the content received by the content receiver 122 is or includes audio content for presentation on one or more audio output devices (not illustrated). Examples of content receiver 122 may include, but are not limited to, a set-top box, a cable connection box, a computer, television receiver, radio receiver, or other content receivers. The display device 124 may be any kind of visual content display device, such as, but not limited to a television, monitor, projector, or other display device.

Although FIG. 1 illustrates the content receiver 122 as providing content for display on a display device 124 located on the viewer premises 120, embodiments are not so limited. In some embodiments, the content receiver 122 provides the content to a viewer's mobile device (not illustrated), such as a smartphone, tablet, or other computing device, that is at a remote location to the user premises 120. In yet other embodiments, the content receiver 122 and the display device 124 may be integrated into a single computing device, such as the viewer's desktop computer, laptop computer, smart phone, tablet computer, etc.

The remote control 130 is a handheld device that enables a user to control the content receiver 122 or the display device 124. These controls may include, changing channels, viewing a channel guide, changing volume, adjusting display settings, turning on/off closed captioning, etc. As described herein, as a user pushes buttons on the remote control 130, a delay factor is obtained or generated.

In some embodiments, the content receiver 122 may store profiles for one or more users. The profiles can be accessed based on an identity of the user, from which the delay factor is obtained. The user may be identified based on a pattern of button press times, using video recognition on images of the user captured by a camera, receiving a user input code, etc. Each profile may store one or more delay factors for the users. For example, one delay factor may be stored for waiting between button presses, and another delay factor may be stored for how long to display a menu.

In other embodiments, the delay factor may be generated based on button press times associated with those button pushes. In some embodiments, the button press times may be a time between pressing one button and subsequently pressing the same or another button. In other embodiments, the button press times may be a time in which an individual button is being depressed. A sequence of multiple button presses and button press times can be used to generate a delay factor that is used by the content receiver 122, or the display device 124 to employ a content receiver event. The content receiver event may be performed by the content receiver 122 or by the display device 124. For example, the delay factor may indicate how long the content receiver is to wait for a next button press, how long to display a menu to the user, how long to display closed captioning, how fast graphical user interface animations are to proceed, etc. Different delay factors can be employed for different content receiver events.

The delay factor may also be generated or determined for a user using other methods. In some embodiments, the remote control 130 may include gyroscopes, pressure sensor, or other sensors that can obtain data that can be used to generate the delay factor. For example, the delay factor may be generated based on the pressure in which the user pushes buttons, as determined via data captured by pressure sensors for each button. In other embodiments, the delay factor may be automatically selected for the users based on demographic or medical information of the users, e.g., the user's age, whether the user is missing a finger, whether the user has arthritis, whether the user has poor eyesight, etc. In various embodiments, crowdsourced information from other users may be used to select the delay factor for the user. In at least one such embodiments, a machine learning model may be trained using delay factors and other information (e.g., demographic information, medical information, button press times, etc.) from a plurality of other users.

Once the delay factor is obtained or generated, the content receiver 122, or the display device 124, may perform an event or action based on the delay factor. As described herein, the delay factor is used to dynamically cause the content receiver 122 or the display device 124 to customize the viewing experience for the user. The delay factor is used to adjust, in real time, how long events take, such as waiting for a next button press, displaying a menu, displaying closed captioning, etc.

The following briefly discusses additional components in example environment 100. In various embodiments, the content distributor 102 provides content to the content receiver 122. The content distributor 102 may receive a plurality of different content from one or more content providers 104, one or more information providers 106, or a combination thereof. The content distributor 102 provides content and supplemental content, whether obtained from content provider 104 or the data from information provider 106, to a viewer through a variety of different distribution mechanisms. For example, in some embodiments, content distributor 102 may provide the content and data to a viewer's content receiver 122 directly through communication network 110 on link 111. In other embodiments, the content may be sent through uplink 112, which goes to satellite 114 and back to downlink station 116 that may also include a head end (not shown). The content is then sent to an individual content receiver 122 of a viewer/customer at viewer premises 120 via link 113.

Typically, content providers 104 generate, aggregate, and/or otherwise provide content that is provided to one or more viewers. Sometimes, content providers are referred to as "channels" or "stations." Examples of content providers 104 may include, but are not limited to: film studios; television studios; network broadcasting companies; independent content producers, such as AMC, HBO, Showtime, or the like; radio stations; or other entities that provide content for viewer consumption. A content provider may also include individuals that capture personal or home videos and distribute these videos to others over various online media-sharing websites or other distribution mechanisms. The content provided by content providers 104 may be referred to as the program content, which may include movies, sitcoms, reality shows, talk shows, game shows, documentaries, infomercials, news programs, sports programs, songs, audio tracks, albums, or the like. In this context, program content may also include commercials or other television or radio advertisements. It should be noted that the commercials may be added to the program content by the content providers 104 or the content distributor 102. Embodiments described herein generally refer to content, which includes visual content, audio content, or audiovisual content that includes a video and audio component.

In at least one embodiment, information provider 106 creates and distributes data or other information that describes or supports content. Generally, this data is related to the program content provided by content provider 104. For example, this data may include metadata, program name, closed-caption authoring and placement within the program content, timeslot data, pay-per-view and related data, or other information that is associated with the program content. In some embodiments, a content distributor 102 may combine or otherwise associate the data from information provider 106 and the program content from content provider 104, which may be referred to as the distributed content or more generally as content. However, other entities may also combine or otherwise associate the program content and other data together.

In at least one embodiment, communication network 110 is configured to couple various computing devices to transmit content/data from one or more devices to one or more other devices. For example, communication network 110 may be the Internet, X.25 networks, or a series of smaller or private connected networks that carry the content. Communication network 110 may include one or more wired or wireless networks, which may include cellular networks.

The operation of certain aspects will now be described with respect to FIGS. 2-5. Processes 200, 300, 400, and 500 described in conjunction with FIGS. 2-5, respectively, may be implemented by one or more processors or executed via circuitry on one or more computing devices, such as content receiver 122 in FIG. 1. In some embodiments, one or more steps or functions or processes described herein, may be implemented by one or more processors or executed via circuitry on remote control 130 in FIG. 1.

Figure 2:
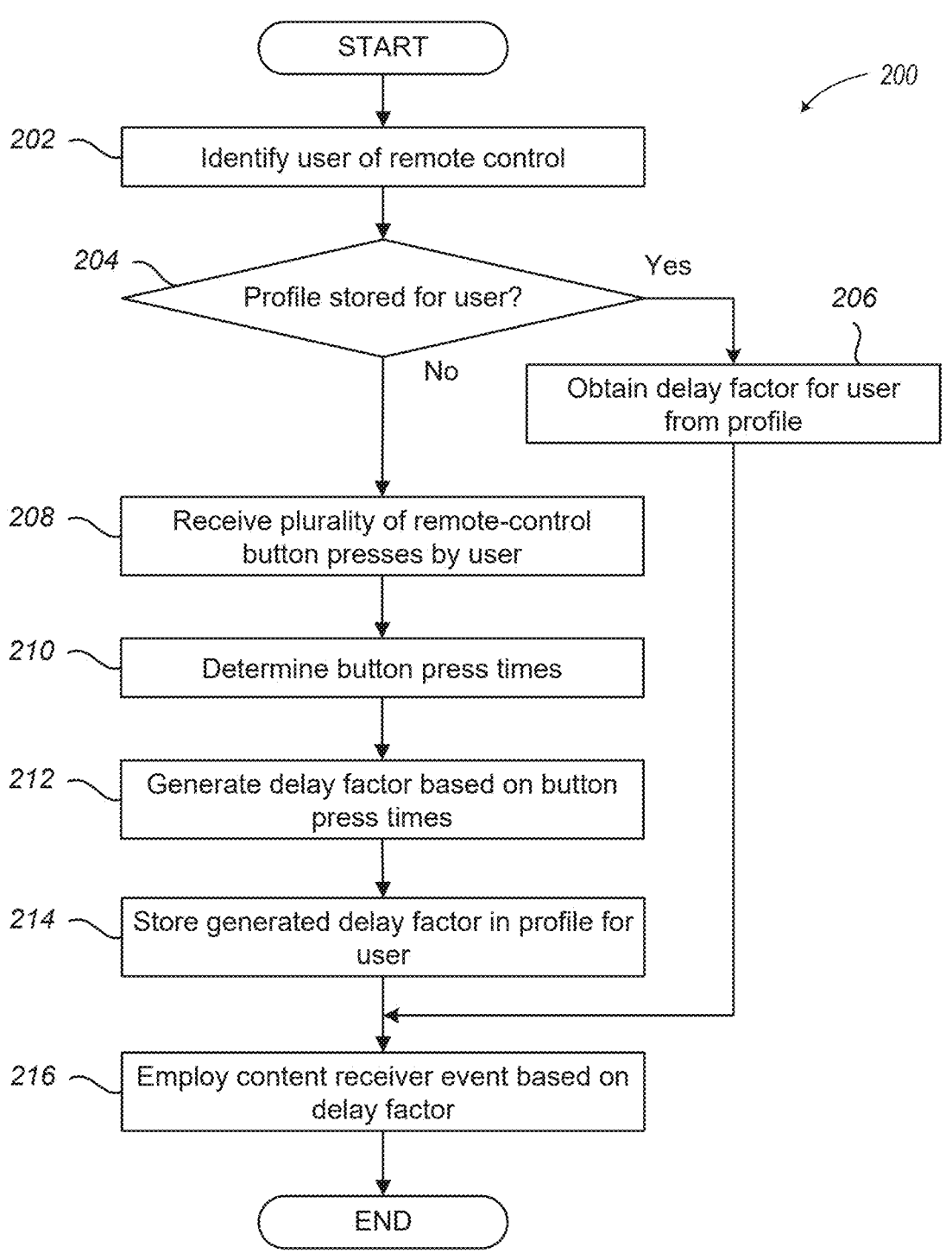
FIG. 2 illustrates a logical flow diagram showing one embodiment of a process for dynamically employing a content receiver event based on a delay factor generated for a user of a content receiver in accordance with embodiments described herein.

FIG. 2 illustrates a logical flow diagram showing one embodiment of a process for dynamically employing a content receiver event based on a delay factor generated for a user of a content receiver in accordance with embodiments described herein.

Process 200 begins, after a start block, at block 202, where a user of a remote control is identified. In some other embodiments, the button press times may be used to identify a specific user. For example, a plurality of button press times can first be obtained, similar to block 210 described below. Because different users may press buttons differently, different button press times can be turned into different patterns or signatures for different users. Accordingly, a database of users can be queried for the button press time signature, which can return the identity of the user. Other types of user identification may also be used, such as a user code, facial recognition, voice recognition, smartphone applications, etc. In yet other embodiments, the user may be identified as a new user.

Process 200 proceeds, after block 202, to decision block 204, where a determination is made whether a profile has been previously stored for the user. In some embodiments, a database of user profiles is queried for the identified user. If a profile has been stored for the user, then process 200 flows to block 206; otherwise, if the user is a new user with no previously stored profile, then process 200 flows to block 208.

At block 208, a plurality of remote-control button presses by a user are received. In some embodiments, the plurality of remote-control button presses may include the sequence of specific buttons that are pressed by the user. As one non-limiting example, the button presses may be "6," "3," "1," "enter," which may correspond to the user typing in channel six hundred thirty-one. In other embodiments, the plurality of remote-control button presses may identify a number individual button presses, but may not indicate the specific buttons that were pressed.

In some embodiments, the plurality of button presses are received together, such as if process 200 is being performed after a sequence or series of multiple button presses. In other embodiments, each individual button press may be received separately as the user presses each corresponding button, such as if process 200 is being performed as the user is in the act of pressing one button after another.

Process 200 proceeds, after block 208, to block 210, where one or more button press times are determined. In some embodiments, the one or more button press times includes an amount of time in between each individual button press, e.g., the time lapse between when the user releases a first button to when the user depresses a second button. In other embodiments, the one or more button press times may be an amount of time in which each separate button is depressed, e.g., the time lapse between when the user depresses a specific button to when the user releases that specific button. In various embodiments, the button press times may be calculated as each button is being pressed and received at block 208.

In some embodiments, the one or more button press times may be included with the receipt of the plurality of button presses. For example, the sequence of button presses may include: button "6," 1.3 seconds, button "3," 2.7 seconds, button "1," 2.1 seconds, "enter." Assuming the button press times are the time between button presses, this sequence may correspond to the user pressing the number six button, then pressing the number three button 1.3 seconds after pressing the number six button, then pressing the number one button 2.7 seconds after pressing the number three button, then pressing the enter button 2.1 seconds after pressing the number one button. But assuming the button press times are the times buttons are depressed, the same sequence of button presses may correspond to the user pressing the number six button for 1.3 seconds, then pressing the number three button for 2.7 seconds, then pressing the number one button for 2.1 seconds, then pressing the enter button.

In other embodiments, the one or more button press times may be calculated as each button is being pressed. For example, a timer may be started when a first button is pressed and stopped when a second button is pressed. Or a timer may be started when a first button press is released and stopped when a second button is depressed. The result of the timer indicates the button press time between the first button being pressed and the second button being pressed. As another example, a timer may be started when a button is depressed and stopped when that same button is released. The results of the timer indicate how long the button was being pressed by the user.

Process 200 continues, after block 210, at block 212, where a delay factor is generated for the user of the remote control based on the button press times. In some embodiments, the delay factor may be generated based on an average of all button press times. In other embodiments, the delay factor may be generated based on a weighted average of all button press times, where the times are weighted based on the physical distance between the buttons that were being pressed.

The delay factor represents an amount of time that the content receiver is to perform or employ an event. The delay factor may be an exact amount of time, a representative numerical value, a weighted numerical value, a grade (e.g., small delay, medium delay, long delay), or other variable that can be applied by the content receiver to adjust the time associated with the content receiver event.

Process 200 continues, after block 212, at block 214, where the generated delay factor is stored in a profile for the user. In some embodiments, the profile may have one delay factor stored for the user. In other embodiments, a plurality of delay factors may be stored in the profile, where each separate delay factor is for a separate type of content receiver event. For example, a first delay factor may be stored for wait times between button presses, and a second delay factor may be stored for the delay in how long menus are displayed to the user.

If, at decision block 204, a profile was previously stored for the user, process 200 flows from decision block 204 to block 206. At block 206, a delay factor is obtained from the user's profile. In some embodiments, the delay factor is selected from a plurality of delay factors based on the content receiver event that is to be employed.

After block 214 or block 206, process 200 proceeds to block 216, where a content receiver event is employed based on the generated or obtained delay factor. In general, the user experience for the user when using the content receiver is customized based on the generated or obtained delay factor.

As noted above, the delay factor may be an exact amount of time, a representative numerical value, a weighted numerical value, a grade (e.g., small delay, medium delay, long delay), or some other representation of delay. Accordingly, in some embodiments, the content receiver can directly apply the delay factor to the event, such as an exact amount of time in which to wait between button presses. In other embodiments, the content receiver can apply a pre-set value that is selected based on the delay factor (e.g., 2 seconds for a small delay factor, 4 seconds for a medium delay factor, or 6 seconds for a long delay factor).

The content receiver event may include, but is not limited to, waiting for a next button to be pressed, temporarily displaying a menu, displaying closed captioning, graphical user interface animations, or other time-based actions that may impact the user's interactions with the content receiver or the user's experience with the content. As one example, content receiver sets a wait time for a next button press based on the delay factor. As another example, the content receiver may display a menu to the user for a set amount of time based on the delay factor. As yet another example, the content receiver may display closed captioning based on the delay factor. In this example, the delay factor may indicate an amount of time for each closed captioning or a dynamic amount that changes based on the number of characters or words to be displayed with each closed captioning phrase.

The delay factor may be applied differently to different content receiver events. For example, the wait time between number button presses on the remote may be different from the wait time between volume adjust button presses on the remote. As another example, the wait time after pressing the "1" button and a subsequent button may be different from a wait time after pressing the "5" button—this difference may be due to the physical distance between the pressed button and a next possible button press.

After block 216, process 200 terminates or otherwise returns to a calling process to perform other actions.

Figure 3:
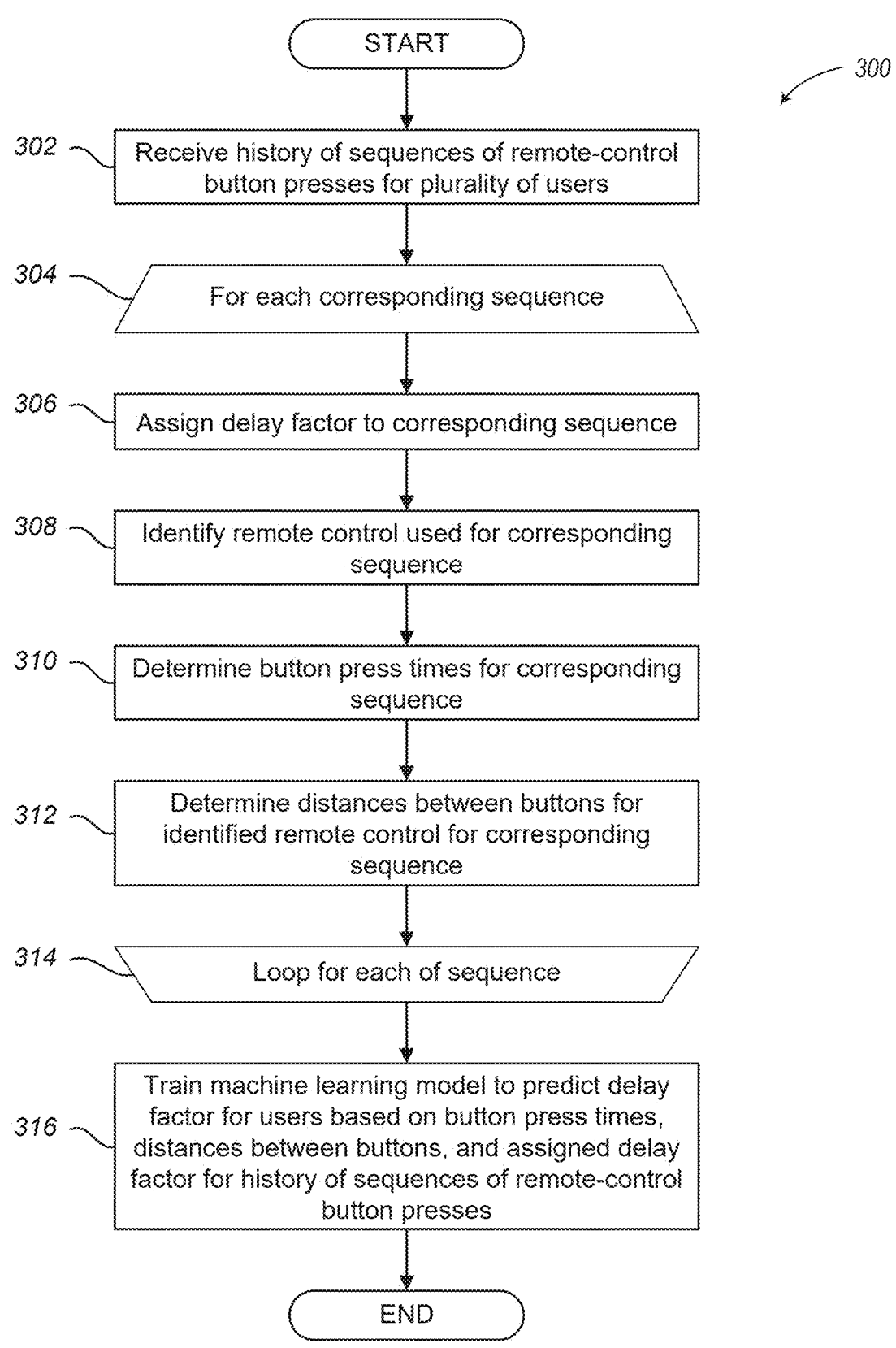
FIG. 3 illustrates a logical flow diagram showing one embodiment of a process for training a machine learning model to predict delay factors based on a history of sequences of remote-control button presses for a plurality of users in accordance with embodiments described herein.

FIG. 3 illustrates a logical flow diagram showing one embodiment of a process 300 for training a machine learning model to predict delay factors based on a history of sequences of remote-control button presses for a plurality of users in accordance with embodiments described herein.

Process 300 begins, after a start block, at block 302, where a history of sequences of remote-control button press for a plurality of users are received. In various embodiments, the history of sequences of remote-control button presses may be obtained from the profiles of a plurality of users or collected as users press remote-control buttons, similar to block 208 in FIG. 2.

Process 300 proceeds, after block 302, to block 304, where each corresponding sequence of remote-control button presses is selected from the history of sequences to be processed.

At block 306, a delay factor is assigned to each corresponding sequence. In some embodiments, the delay factors may be obtained along with the corresponding sequence from the profile of a user or determined as a user press remote-control buttons or generated based on the button press times, similar to block 212 in FIG. 2.

Process 300 continues, after block 306, at block 308, where a remote control used for the corresponding sequence is identified. In some embodiments, the specific model of remote control is identified, such as by a unique model identifier output by the remote control. In other embodiments, an administrator may add or identify the remote control with the corresponding sequence.

Process 300 proceeds, after block 308, to block 310, where button press times are determined for the corresponding sequence. In various embodiments, the button press times are determined similar to block 210 in FIG. 2.

Process 300 continues, after block 310, at block 312, where distances between buttons on the identified remote control are determined for the corresponding sequence. The distances are determined for each subsequent button press in the corresponding sequence. In some embodiments, the distances are physical distances, such as 1.0 centimeters, 3.3 centimeters, etc.

In some embodiments, the system correlates the physical distance between buttons within the sequence with the button press times. One example corresponding sequence may include: button "6," 1.3 seconds, button "3," 2.7 seconds, button "1," 2.1 seconds, "enter." In this example, assuming the button press times are the time between button presses, this sequence may correspond to the user pressing the number six button, then pressing the number three button 1.3 seconds after pressing the number six button, then pressing the number one button 2.7 seconds after pressing the number three button, then pressing the enter button 2.1 seconds after pressing the number one button. The corresponding sequence can then be augmented with the physical distances between the button presses, such as button "6," 1.3 seconds and 1.0 centimeter, button "3," 2.7 seconds and 2.2 centimeters, button "1," 2.1 seconds and 2.1 centimeters, "enter." Once augmented, this sequence may correspond to the user pressing the number six button, then moving their finger 1.0 centimeters to press the number three button 1.3 seconds after pressing the number six button, then moving their finger 2.2 centimeters to press the number one button 2.7 seconds after pressing the number three button, then moving their finger 2.1 centimeters to press the enter button 2.1 seconds after pressing the number one button.

Block 314 loops to block 304 to select each corresponding sequence from the history of sequences of button presses.

After block 314, process 300 proceeds to block 316, where a machine learning model is trained to predict the delay factor for other users based on the button press times, the distances between buttons, and the assigned delay factors for the history of sequences of remote-control button presses. In some embodiments, the machine learning model may be trained on additional user profile information, user watch times, etc. that correspond to the history of sequences of button presses.

After block 316, process 400 terminates or otherwise returns to a calling process to perform other actions. In some embodiments, process 300 may be employed multiple times to train separate models for different types of content receiver events.

FIG. 4 illustrates a logical flow diagram showing one embodiment of a process 400 for employing a trained a machine learning model to predict a delay factor for a target user in accordance with embodiments described herein. In some embodiments, process 400 may be employed as the target user is using a remote control to operate a content receiver. In other embodiments, process 400 may be employed as an initial step when the target user is setting up the content receiver.

Process 400 begins, after a start block, at block 402, where a target sequence of remote-control button presses are received from a target user. In some embodiments, this target sequence of button presses may be received or obtained similar to block 208 in FIG. 2. In some embodiments, the target user may be instructed to press specific buttons in accordance with a initial setup step.

Process 400 proceeds, after block 402, to block 404, where button press times are determined for the target sequence of remote-control button presses. In some embodiments, the button press times may be determined similar to block 210 in FIG. 2.

Process 400 continues, after block 404, at block 406, where a remote control used by the target user to input the target sequence is identified. In some embodiments, the remote control may be identified similar to block 308 in FIG. 3.

Process 400 proceeds, after block 406, to block 408, where distances between button presses are determined for the identified remote control for the target sequence. In some embodiments, the distances between button presses may be determined similar to block 312 in FIG. 3.

Process 400 continues, after block 408, at block 410, where the machine learning model trained at block 316 in FIG. 3 is employed to predict a delay factor for the target user using the button press times, the button distances, and the remote control used by the target user. In various embodiments, the button press times, the button distances, and the remote control used by the target user are input into the trained model, which outputs the predicted delay factor for the target user. In some embodiments, the trained model may be selected from a plurality of trained models, where each of the plurality of models are trained for different types of content receiver events.

Process 400 proceeds, after block 410, to block 412, where a user profile is generated or updated for the target user to include the predicted delay factor, which may be similar to block 214 in FIG. 2.

After block 412, process 400 terminates, or otherwise returns to a calling process to perform other actions. In some embodiments, process 400 may be employed multiple times for different types of content receiver events.

FIG. 5 shows a system diagram that describe various implementations of computing systems for implementing embodiments described herein. System 500 includes content receiver 122, display device 124, and remote control 130.

Content receiver 122 receives and provides content for presentation to a user via display device 124. In general, the content receiver 122 monitors user button presses on the remote control 130 to obtain, select, or generate a delay factor for the user currently using the remote control 130. The content receiver 122 can dynamically adjust how long actions or events take to occur based on the delay factor, as described herein. One or more special-purpose computing systems may be used to implement content receiver 122. Accordingly, various embodiments described herein may be implemented in software, hardware, firmware, or in some combination thereof. Content receiver 122 may include memory 530, processor 544, I/O interfaces 548, other computer-readable media 550, and network connections 552.

Memory 530 may include one or more various types of non-volatile and/or volatile storage technologies. Examples of memory 530 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 530 may be utilized to store information, including computer-readable instructions that are utilized by processor 544 to perform actions, including embodiments described herein.

Processor 544 includes one or more processors, one or more processing units, programmable logic, circuitry, or one or more other computing components that are configured to perform embodiments described herein or to execute computer instructions to perform embodiments described herein. In some embodiments, a processor system of the content receiver 122 may include a single processor 544 that operates individually to perform actions. In other embodiments, a processor system of the content receiver 122 may include a plurality of processors 544 that operate to collectively perform actions, such that one or more processors 544 may operate to perform some, but not all, of such actions. Reference herein to "a processor system" of the content receiver 544 refers to one or more processors 544 that individually or collectively perform actions. And reference herein to "the processor system" of the content receiver 122 refers to 1) a subset or all of the one or more processors 544 comprised by "a processor system" of the content receiver 122 and 2) any combination of the one or more processors 544 comprised by "a processor system" of the content receiver 122 and one or more other processors 544.

Memory 530 may have stored thereon remote interface module 532, delay factor generation module 534, and content presentation module 536. The remote interface module 532 is configured to receive commands and information, such as button presses, from the remote control 130. In some embodiments, the remote interface module 532 may also receive button press times from the remote control 130 or the remote interface module 532 may calculate the button press times based on when it receives the commands and information from the remote control 130. The delay factor generation module 534 is configured to obtain or generate a delay factor, as described herein. The content presentation module 536 is configured to coordinate the display or presentation of content on the display device 124. Although the remote interface module 532, the delay factor generation module 534, and the content presentation module 536 are shown as separate modules, embodiments are not so limited. Rather, a single module or a plurality of modules may be utilized to perform the functionality of the remote interface module 532, the delay factor generation module 534, and the content presentation module 536.

The memory 530 may also store user profiles 538 or other data (not illustrated).

Network connections 552 are configured to communicate with other computing devices, such as display device 124 or remote control 130. I/O interfaces 548 may include a keyboard, audio interfaces, video interfaces, or the like. Other computer-readable media 550 may include other types of stationary or removable computer-readable media, such as removable flash drives, external hard drives, or the like.

The display device 124 and the remote control 130 may include computing components similar to content receiver 122 or include circuitry to perform similar functionality, but they are not shown in FIG. 5. For example, the remote control 130 may include circuitry that is configured to perform embodiments described herein.

The following is a summarization of the claims as originally filed.

A method may be summarized as including: receiving a plurality of remote-control button presses by a user; determining at least one button press time associated with the plurality of remote-control button presses; generating a delay factor for the user based on the at least one button press time; and employing at least one content receiver event based on the generated delay factor.

Generating the delay factor for the user may include: determining a physical distance between buttons associated with the plurality of remote-control button presses; and generating the delay factor for the user based on the at least one button press time relative to the physical distance between the buttons.

Generating the delay factor for the user may include: determining an average time between button presses; and setting the delay factor for the user based on the average time between button presses.

Generating the delay factor for the user may include: determining a time delay between a first button press and a second button press; and setting the delay factor for the user based on the time between the first button press and the second button press.

Generating the delay factor for the user may include: determining an amount of pressure applied to at least one button; and generating the delay factor for the user based on the at least one button press time and the amount of pressure applied to the at least one button.

The method may further include: storing delay factor in a profile for the user.

Generating the delay factor for the user may include: identifying the user based on the at least one button press time; and obtaining the delay factor stored in a profile for the identified user.

Employing the at least one content receiver event based on the generated delay factor may include: setting an amount of time to wait for a next button press based on the generated delay factor.

Employing the at least one content receiver event based on the generated delay factor may include: setting an amount of time to display messages to the user based on the generated delay factor.

Employing the at least one content receiver event based on the generated delay factor may include: setting an amount of time to display closed captioning to the user based on the generated delay factor.

Employing the at least one content receiver event based on the generated delay factor may include: setting a speed at which graphical user interface animations are presented to the user based on the generated delay factor.

The method may further include: receiving a second plurality of remote-control button presses by the user; determining at least one second button press time associated with the second plurality of remote-control button presses; generating a new delay factor for the user based on the at least one second button press time, wherein the new delay factor is different from the delay factor; and employing at least one second content receiver event based on the new delay factor.

A content receiver may be summarized as comprising: a memory that stores computer instructions; and a processor system that executes the computer instructions to: identify a user of the content receiver; select a delay factor for the user; and customize a user experience for the user when using the content receiver based on the selected delay factor for the user.

The processor system of the content receiver may identify the user of the content receiver by further executing the computer instructions to: receive a plurality of remote-control button presses by the user; determine at least one button press time associated with the plurality of remote-control button presses; and identify the user based on the at least one button press time.

The processor system of the content receiver may select the delay factor for the user by further executing the computer instructions to: receive a plurality of remote-control button presses by the user; determine at least one button press time associated with the plurality of remote-control button presses; and generate the delay factor for the user based on the at least one button press time.

The processor system of the content receiver may select the delay factor for the user by further executing the computer instructions to: receive a sequence of remote-control button presses by the user; determine button press times for the sequence of remote-control button presses; identify a remote control used by the user for the sequence of remote-control button presses; and employ a trained machine learning model to predict the delay factor for the user based on the button press times and the remote control used by the user.

The processor system of the content receiver may further execute the computer instructions to: receive a history of sequence of remote-control button presses for a plurality of users; assign delay factor to each sequence of remote-control button presses based on button press times; identify a remote control used for each sequence of remote-control button presses; and train a machine learning model to predict delay factors based on the button press times, the identified remote control, and assigned delay factor for each sequence of remote-control button presses.

The processor system of the content receiver may further execute the computer instructions to: determine a demographic profile for the user; crowdsource delay factors for each of a plurality of other users that match the demographic profile for the user; and set the delay factor for the user based on the crowdsourced delay factors.

The processor system of the content receiver may further execute the computer instructions to: receive feedback from the user on the user experience; and modify the delay factor based on the received feedback.

A non-transitory computer-readable medium may be summarized as storing computer instructions that, when executed by at least one processor of a content receiver, cause the at least one processor to perform actions, the actions comprising: identifying a user of the content receiver; determining at least one button press time associated with a plurality of remote-control button presses by the user; obtaining a delay factor for the user based on the at least one button press time; and customizing a user experience for the user when using the content receiver based on the delay factor for the user.

The various embodiments described above can be combined to provide further embodiments. These and other changes can be made to the embodiments in light of the above-detailed description. All of the U.S. patents, U.S. patent application publications, U.S. patent applications, foreign patents, foreign patent applications and non-patent publications listed in the Application Data Sheet are incorporated by reference, in their entirety. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   receiving a plurality of remote-control button presses on a remote control by a user;
   determining at least one button press time associated with the plurality of remote-control button presses;
   determining a physical distance between separate buttons on the remote control associated with the plurality of remote-control button presses;
   generating a delay factor for the user based on the at least one button press time and the physical distance between the separate buttons;
   adjusting the delay factor based on feedback received from the user; and
   employing at least one content receiver event based on the adjusted delay factor.

2. The method of claim 1, wherein generating the delay factor for the user comprises:

determining an average time between button presses; and setting the delay factor for the user based on the average time between button presses.

3. The method of claim 1, wherein generating the delay factor for the user comprises:

determining a time delay between a first button press and a second button press; and setting the delay factor for the user based on the time between the first button press and the second button press.

4. The method of claim 1, wherein generating the delay factor for the user comprises:

determining an amount of pressure applied to at least one button; and generating the delay factor for the user based on the at least one button press time and the amount of pressure applied to the at least one button.

5. The method of claim 1, further comprising:

storing delay factor in a profile for the user.

6. The method of claim 1, wherein generating the delay factor for the user comprises:

identifying the user based on the at least one button press time; and obtaining the delay factor stored in a profile for the identified user.

7. The method of claim 1, wherein employing the at least one content receiver event based on the adjusted delay factor comprises:

setting an amount of time to wait for a next button press based on the adjusted generated delay factor.

8. The method of claim 1, wherein employing the at least one content receiver event based on the adjusted delay factor comprises:

setting an amount of time to display messages to the user based on the adjusted delay factor.

9. The method of claim 1, wherein employing the at least one content receiver event based on the adjusted delay factor comprises:

setting an amount of time to display closed captioning to the user based on the adjusted delay factor.

10. The method of claim 1, wherein employing the at least one content receiver event based on the adjusted delay factor comprises:

setting a speed at which graphical user interface animations are presented to the user based on the adjusted delay factor.

11. The method of claim 1, further comprising:

receiving a second plurality of remote-control button presses by the user;

determining at least one second button press time associated with the second plurality of remote-control button presses;

generating a new delay factor for the user based on the at least one second button press time, wherein the new delay factor is different from the delay factor; and employing at least one second content receiver event based on the new delay factor.

12. A content receiver, comprising:

a memory that stores computer instructions; and a processor system that executes the computer instructions to:

identify a user of the content receiver;

select a delay factor for the user;

customize a user experience for the user when using the content receiver based on the selected delay factor for the user;

receive feedback from the user on the user experience; and modify the delay factor based on the received feedback.

13. The content receiver of claim 12, wherein the processor system identifies the user of the content receiver by further executing the computer instructions to:

receive a plurality of remote-control button presses by the user;

determine at least one button press time associated with the plurality of remote-control button presses; and identify the user based on the at least one button press time.

14. The content receiver of claim 12, wherein the processor system selects the delay factor for the user by further executing the computer instructions to:

receive a plurality of remote-control button presses by the user;

determine at least one button press time associated with the plurality of remote-control button presses; and generate the delay factor for the user based on the at least one button press time.

15. The content receiver of claim 12, wherein the processor system selects the delay factor for the user by further executing the computer instructions to:

receive a sequence of remote-control button presses by the user;

determine button press times for the sequence of remote-control button presses;

identify a remote control used by the user for the sequence of remote-control button presses; and employ a trained machine learning model to predict the delay factor for the user based on the button press times and the remote control used by the user.

16. The content receiver of claim 12, wherein the processor system further executes the computer instructions to:

receive a history of sequence of remote-control button presses for a plurality of users;

assign delay factor to each sequence of remote-control button presses based on button press times;

identify a remote control used for each sequence of remote-control button presses; and train a machine learning model to predict delay factors based on the button press times, the identified remote control, and assigned delay factor for each sequence of remote-control button presses.

17. The content receiver of claim 12, wherein the processor system further executes the computer instructions to:

determine a demographic profile for the user;

crowdsource delay factors for each of a plurality of other users that match the demographic profile for the user; and set the delay factor for the user based on the crowdsourced delay factors.

18. A non-transitory computer-readable medium storing computer instructions that, when executed by at least one processor of a content receiver, cause the at least one processor to perform actions, the actions comprising:

identifying a user of the content receiver;

determining at least one button press time associated with a plurality of remote-control button presses by the user;

obtaining a delay factor for the user based on the at least one button press time; and customizing a user experience for the user when using the content receiver based on the delay factor for the user, including:

setting an amount to time at which to display information to the user based on the generated delay factor.

\*   \*   \*   \*   \*